(12) United States Patent
van Nieuwstadt et al.

(10) Patent No.: US 7,137,246 B2
(45) Date of Patent: Nov. 21, 2006

(54) CONTROL FOR DIESEL ENGINE WITH PARTICULATE FILTER

(75) Inventors: Michiel J. van Nieuwstadt, Ann Arbor, MI (US); Tom Alan Brewbaker, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 576 days.

(21) Appl. No.: 10/063,454

(22) Filed: Apr. 24, 2002

(65) Prior Publication Data
US 2003/0200745 A1   Oct. 30, 2003

(51) Int. Cl.
*F01N 3/00* (2006.01)

(52) U.S. Cl. .............. 60/295; 60/274; 60/278; 60/280; 60/285; 60/286; 60/297; 60/311

(58) Field of Classification Search ........... 60/274, 60/285, 295, 297, 311
See application file for complete search history.

(56) References Cited

U.S. PATENT DOCUMENTS

| | | | |
|---|---|---|---|
| 4,211,075 A * | 7/1980 | Ludecke et al. ............ 60/285 |
| 4,535,588 A * | 8/1985 | Sato et al. .................. 60/286 |
| 4,732,593 A * | 3/1988 | Kondo et al. ............... 55/523 |
| 4,747,264 A | 5/1988 | Santiago et al. |
| 4,813,233 A | 3/1989 | Vergeer et al. |
| 4,835,963 A * | 6/1989 | Hardy ....................... 60/274 |
| 4,835,964 A * | 6/1989 | Kume et al. ................ 60/285 |
| 5,014,509 A | 5/1991 | Broering et al. |
| 5,042,248 A * | 8/1991 | Abthoff et al. ............. 60/274 |
| 5,044,158 A | 9/1991 | Goerlich |
| 5,548,995 A | 8/1996 | Clinton et al. |
| 5,601,068 A | 2/1997 | Nozaki |
| 5,701,735 A | 12/1997 | Kawaguchi |
| 5,711,149 A | 1/1998 | Araki |
| 5,822,977 A | 10/1998 | Fukuda et al. |
| 6,574,956 B1 * | 6/2003 | Moraal et al. .............. 60/295 |
| 6,594,990 B1 * | 7/2003 | Kuenstler et al. ........... 60/295 |
| 6,598,387 B1 * | 7/2003 | Carberry et al. ........... 60/297 |

FOREIGN PATENT DOCUMENTS

| | | | |
|---|---|---|---|
| JP | 60-90931 | | 5/1985 |
| JP | 64-87820 | | 3/1989 |
| JP | 64-087820 | * | 3/1989 |
| JP | 5-106518 | | 4/1993 |
| JP | 5-133285 | | 5/1993 |

OTHER PUBLICATIONS

SAE Technical Paper No. 830180, Pauli, E. et al., "The Description of the Regeneration Behavior of Diesel Particulate Traps with the Aid of a Mathematical Model", pp. 1-12.

* cited by examiner

*Primary Examiner*—Thomas Denion
*Assistant Examiner*—Diem Tran
(74) *Attorney, Agent, or Firm*—Allan J. Lippa; Alleman Hall McCoy Russell & Tuttle LLP

(57) ABSTRACT

A system and method are described for operating a diesel engine and particulate filter during self-sustained filter regeneration. In particular, a method is described for preventing over-temperature during filter regeneration by limiting excess oxygen supplied to the particulate filter.

8 Claims, 4 Drawing Sheets

CONTROL FOR DIESEL ENGINE WITH PARTICULATE FILTER

BACKGROUND OF INVENTION

1. Field of the Invention

The present invention relates to engine control strategies for engines and, more particularly, control methods for diesel engines having a diesel particulate filter (DPF).

2. Background Art

Diesel particulate filters (DPFs) are typically used in diesel engines. These filters store particulates generated by engine combustion. When the filter is raised above a predetermined temperature, the retained particles, which are mostly in the form of carbon, are burned off. After a majority of the particles are burned off, the filter can again retain particles generated by the engine.

There are various methods to raise and sustain particulate filter temperature to allow the above-described regeneration. For example, a burner can be used to burn fuel and thereby generate heat. Further, the burner can be controlled based on engine speed and load and temperature as described in U.S. Pat. No. 5,044,158. It is also known that the rate of regeneration is a function of temperature. For example, as described in SAE Paper No. 830180, the rate of regeneration increases with increasing temperature, following an Arrhenius equation.

The inventors herein have recognized that high regeneration temperatures can actually result in a lower integrated fuel economy penalty; and, therefore, it may be desirable to use temperature increasing measures to increase the temperature of the DPF to a level at which the particles (soot) burn rather rapidly. In particular, if enough oxygen is available and the exhaust flow does not absorb too much heat, the reaction may become self-sustaining, i.e., it will continue even after the temperature increasing measures have been deactivated. In other words, it may become unnecessary to use energy, for example, in a burner, to maintain high DPF temperatures sufficient to maintain regeneration.

However, the inventors herein have also recognized a disadvantage with the above approach. In particular, while self-sustained regeneration can decrease a fuel economy penalty, it can cause other disadvantages. In particular, if the reaction rate is too high, the combustion of soot on the filter may result in excessive temperatures that degrade the DPF.

Finally, the inventors have realized that relying on exhaust air flow alone to carry heat away from the DPF may not provide sufficient cooling. In particular, it may not be clear ahead of time if a certain operating condition will allow enough air flow to cool the DPF.

SUMMARY OF INVENTION

A method for regenerating a particulate filter coupled to an internal combustion engine, comprising: commencing a self-sustaining filter regeneration; monitoring whether said regeneration causes temperature of said particulate filter to become greater than a predetermined value; in response to said monitoring, adjusting one or more operating parameters so as to limit exothermic reaction via control of an oxygen amount entering said filter and prevent temperature from rising to become greater than a pre-selected value.

Thus, according to the present invention, it is possible to exploit self-sustaining particulate filter regeneration, without suffering degradation of the particulate filter due to excessive temperatures. In other words, by limiting excess oxygen entering the particulate filter, which thereby limits the exothermic reaction rate, it is possible to prevent over temperature conditions that might otherwise occur due to the self-sustaining reaction.

BRIEF DESCRIPTION OF DRAWINGS

The advantages described herein will be more fully understood by reading an example of an embodiment in which the invention is used to advantage, referred to herein as the description of the invention, with reference to the drawings, wherein.

DETAILED DESCRIPTION

Figure 1:
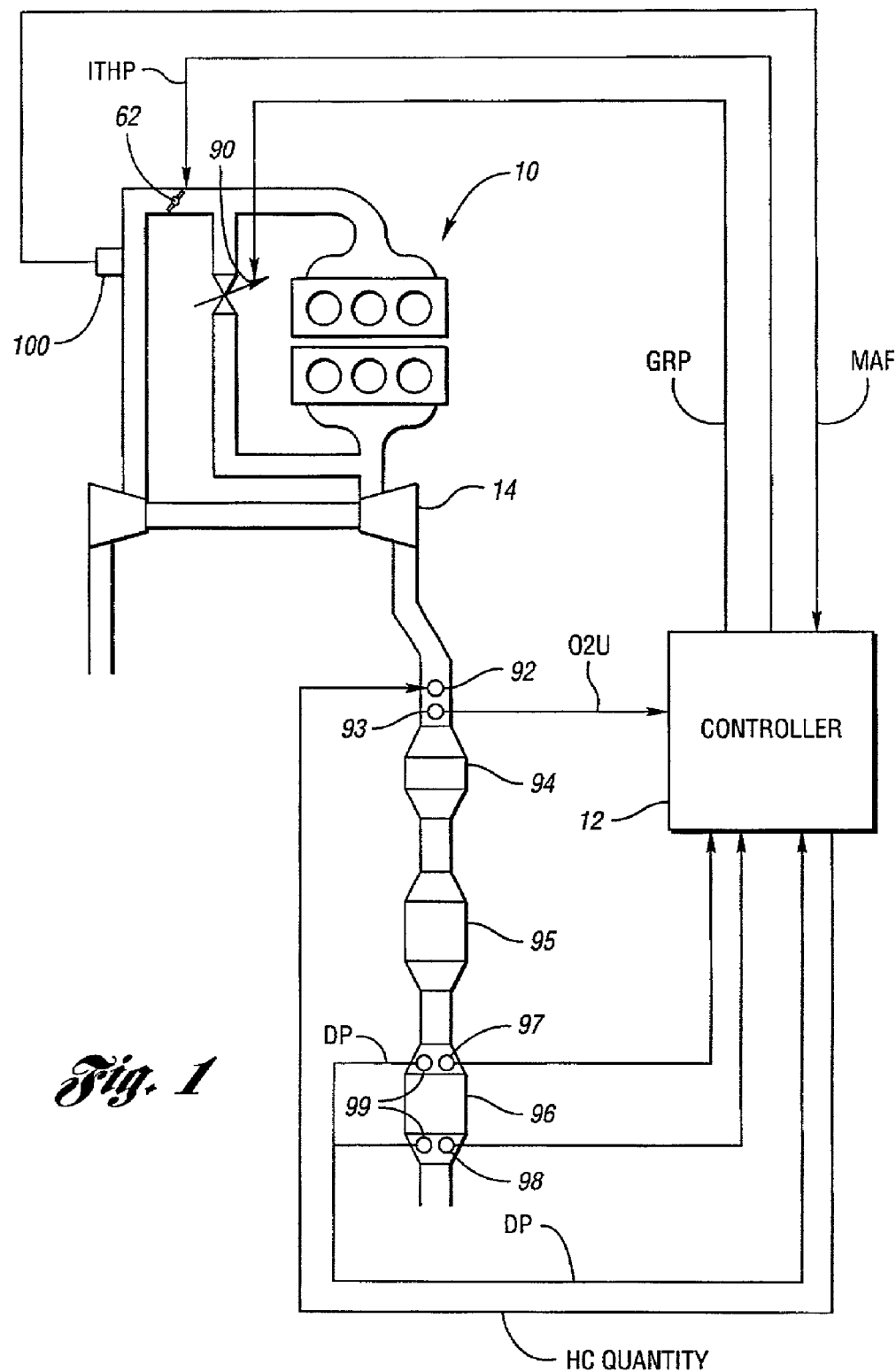
FIG. 1 shows a schematic diagram of an engine system.

Referring now to FIG. 1, a schematic diagram of the engine system is described. Engine 10 is shown coupled to a turbo charger 14. Turbo charger 14 can be any number of types, including a single stage turbo charge, a variable geometry turbo charger, a dual fixed geometry (one for each bank), or a dual variable geometry turbo charger (one for each bank).

Intake throttle 62 is shown for controlling manifold pressure and air flow entering the engine 10. In addition, EGR valve 90 is shown for controlling recirculated exhaust gas entering the intake manifold of engine 10. In the exhaust system, downstream of turbocharger 2 is HC injector 92. Also located downstream of injector 92 is an oxygen sensor 93, which provides signal O2U. Downstream of oxygen sensor 93 is located a first oxidation catalyst 94. A second oxidation catalyst 95 may also be used but may also be eliminated. The oxidation catalyst can be of various types, such as, for example, an active lean NOx catalyst.

Further downstream of catalyst 95 is located a diesel particulate filter 96. A first temperature sensor 97 is located upstream of the particulate filter and a second temperature sensor 98 is located downstream of the particulate filter 96. The particulate filter is typically made of SiC, NZP and cordierite, with SiC being the most temperature resistant, and cordierite the least. Further, independent of the material used, self-sustained filter regeneration can be obtained simply by raising the particulate filter to a high enough temperature.

Further, a differential pressure sensor 99 is coupled to the diesel particulate filter for determining differential pressure across the diesel particulate filter. In particular, the control method according to the present invention determines whether to initiate particulate filter regeneration (in particular, self-sustained particulate filter regeneration) based on the reading of pressure sensor 99 and other engine parameters. Each of the sensors described above provides a measurement indication to controller 12 as described below herein. Further, throttle position and EGR valve position are controlled via a controller 12 as described later herein.

Figure 2:
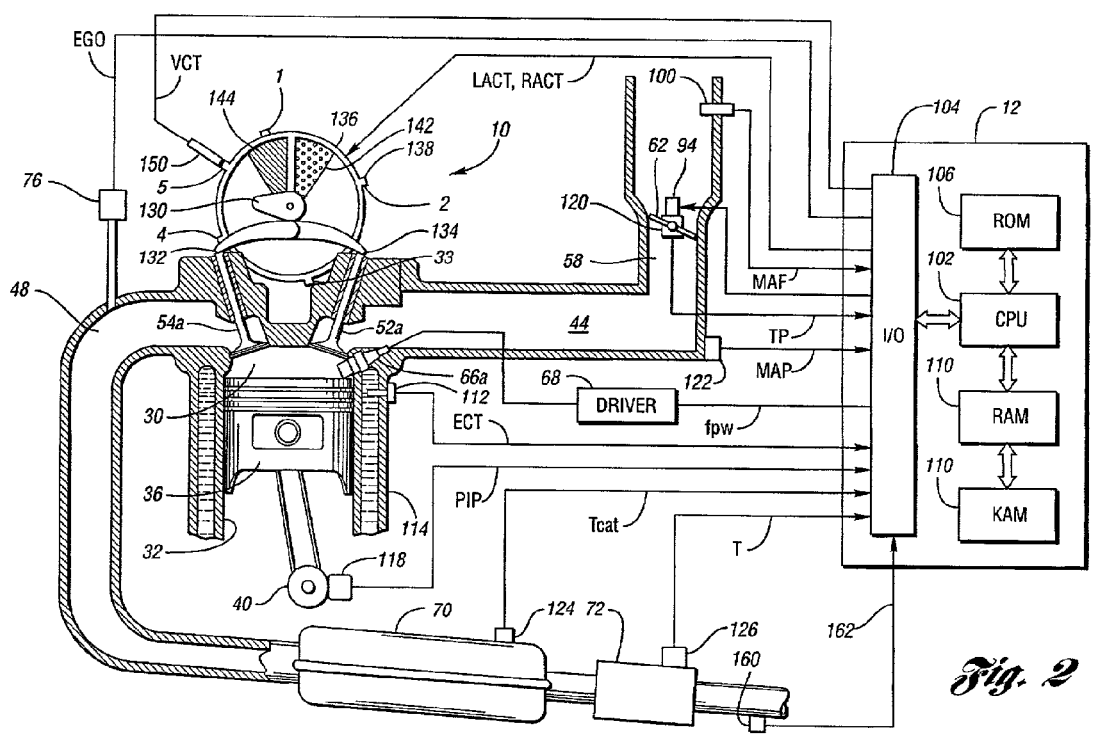
FIG. 2 shows a more detailed view of an engine and controller.

FIG. 2 shows an alternate system configuration according to the present invention. Further, FIG. 2 shows additional details of components shown and described in FIG. 1.

Direct injection compression ignited internal combustion engine 10, comprising a plurality of combustion chambers, is controlled by electronic engine controller 12. Combustion chamber 30 of engine 10 is shown in FIG. 2 including combustion chamber walls 32 with piston 36 positioned therein and connected to crankshaft 40. Combustion chamber or cylinder 30 is shown communicating with intake manifold 44 and exhaust manifold 48 via respective intake valves 52a and 52b (not shown), and exhaust valves 54a and 54b (not shown). Fuel injector 66a is shown directly coupled to combustion chamber 30 for delivering liquid fuel directly therein in proportion to the pulse width of signal fpw received from controller 12 via electronic driver 68. Fuel is delivered to fuel injector 66a by a high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as intake throttle (ITH). In diesels, the ITH is frequently vacuum actuated; however, it could also be electrically actuated.

Exhaust gas oxygen sensor 76 is shown coupled to exhaust manifold 48 upstream of active lean NOx catalyst 70. In this particular example, sensor 76 provides signal EGO to controller 12. This oxygen sensor is a so-called UEGO, or linear oxygen sensor, and provides continuous oxygen readings.

Controller 12 causes combustion chamber 30 to operate in a lean air-fuel mode. Also, controller 12 adjusts injection timing to adjust exhaust gas temperature.

Diesel particulate filter (DPF) 72 is shown positioned downstream of catalyst 70. DPF retains particles and soot to be later regenerated (burned) at high temperatures as described herein.

Controller 12 is shown in FIG. 2 as a conventional unit 102, input/output ports 104, an electronic storage medium for executable programs and calibration values shown as read-only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from variable reluctance sensor (VRS) 118 coupled to crankshaft 40; throttle position TP from throttle position sensor 120; and absolute manifold pressure signal (MAP) from sensor 122. Engine speed signal RPM is generated by controller 12 from signal PIP in a conventional manner and manifold pressure signal MAP from a manifold pressure sensor provides an indication of boost pressure in the intake manifold.

In this particular example, temperature Tcat of catalyst converter 70 and temperature Ttrp of DPF 72 are inferred from engine operation. In an alternate embodiment, temperature Tcat is provided by temperature sensor 124 and temperature Ttrp is provided by temperature sensor 126.

Continuing with FIG. 2, a variable camshaft system is described. However, the present invention can also be used with non-VCT engines. Camshaft 130 of engine 10 is shown communicating with rocker arms 132 and 134 for actuating intake valves 52a, 52b and exhaust valve 54a, 54b. Camshaft 130 is directly coupled to housing 136. Housing 136 forms a toothed wheel having a plurality of teeth 138. Housing 136 is hydraulically coupled to an inner shaft (not shown), which is, in turn, directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3 and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT,RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 provides an indication of oxygen concentration in the exhaust gas. Signal 162 provides controller 12 a voltage indicative of the O2 concentration.

Note that FIG. 2 merely shows one cylinder of a multi-cylinder engine, and that each cylinder has its own set of intake/exhaust valves, fuel injectors, etc.

In FIG. 2, an EGR system is included. In particular, EGR Valve 90 (which can be electrically, pneumatically or magnetically controlled) is positioned in a recirculation tube that transmits exhaust gas from manifold 48 to manifold 44.

Figure 3:
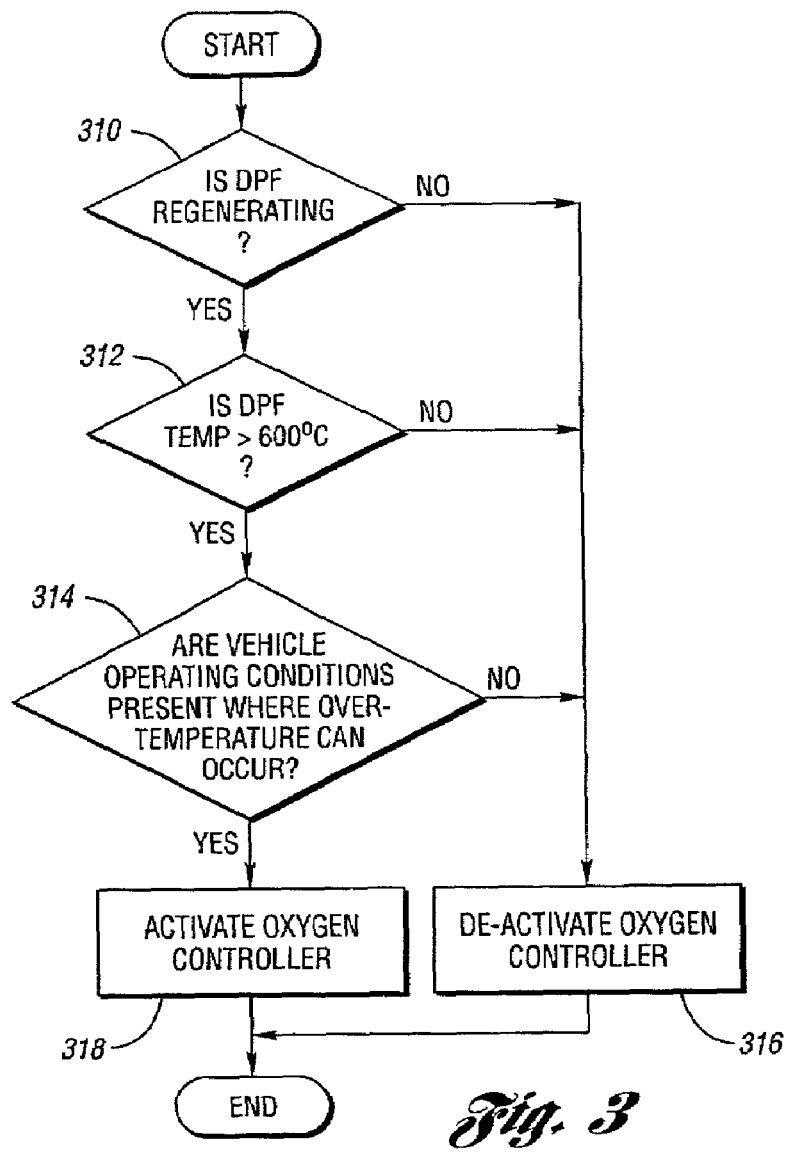
FIG. 3 shows a routine for carrying out the present invention represented by a high level flow diagram.

Referring now to FIG. 3, a routine is described for controlling the engine and particulate filter regeneration. First, in step 310, a determination is made as to whether the particulate filter is regenerating. This determination can be made in various ways, such as, for example, based on a flag set in a control routine, or checking whether the particulate filter has stored particles and temperature is above a predetermined level. When the answer to step 310 is yes, the routine determines if the particulate filter temperature is greater than approximately 600° C. Note that this value is just one exemplary value that can be used. The exact temperature value used may vary depending on various parameters, such as particulate filter materials, size and various other conditions. Further, there are various methods for making this determination, such as based on exhaust gas temperature, particulate filter temperature, or estimates of either of the two temperatures. When the answer to step 312 is yes, the routine continues to step 314. In step 314, the routine determines if vehicle operating conditions are present where an over-temperature condition may occur. For example, the routine determines if the engine is operating in light load, low speed, or other conditions wherever over-temperature may occur. When the answer to step 314 is no, the routine determines that additional control measures to prevent over-temperature, such as limiting oxygen supplied to the particulate filter, are not necessary. In other words, it is not necessary to limit excess oxygen or the exothermic reaction. Alternatively, when the answer to step 314 is yes, the routine continues to step 318. At step 318, the routine activates the oxygen controller as described later herein with particular reference to FIG. 4.

Note, in an alternative embodiment, other control structures can be used. For example, rather than using the EGR valve, the intake throttle, or a hydrocarbon injector, the oxygen concentration in the exhaust can be modified by changing intake or exhaust valve timing on an engine equipped with an appropriate actuator. If the engine is equipped with a variable geometry turbocharger (VGT), the vane setting on the VGT can be modified. If the engine is equipped with an exhaust brake, its position can be modified.

Figure 4:
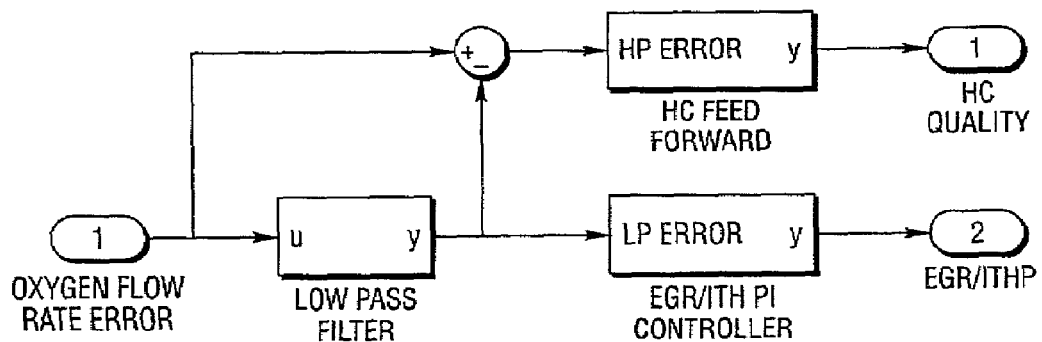
FIG. 4 shows a controller block diagram of an oxygen controller.

Referring now to FIG. 4, a high level schematic of the oxygen controller is shown. In particular in this embodiment, three actuators are used to limit the supply of oxygen delivered to the DPF: an exhaust gas recirculation valve (EGR), an intake throttle (ITH) and a (hydrocarbon) (HC) injector located in the exhaust feedback. EGR and ITH are used in feedback control to account for slowly varying changes in the oxygen flow rate supply to the DPF. An oxygen sensor located in the exhaust feed gas is used as the feedback sensor. In the present embodiment, quick changes in oxygen flow rate are compensated using the HC injector in a feed-forward control. While injecting hydrocarbons can supply additional heat to the DPF, there are instances where this additional heat will be more than compensated for by reducing the exothermic reaction rate (by limiting excess oxygen). Part of the heat added to the system upstream is rejected by heat transfer to the environment through the exhaust system. Adding heat upstream also gives a much more uniform heat distribution that is less likely to damage the DPF than local hot spots resulting from local burning on the DPF.

In particular, the hydrocarbon feed-forward controller, in one embodiment, simply calculates the quantity of fuel necessary to stoichiometrically combust with the high pass oxygen flow rate error. However, the control authority of the HC injection is one-sided since HC injection can only remove excess oxygen.

Referring now specifically to FIG. 4, the oxygen flow rate error (which is the error between the desired and actual oxygen flow rate) is fed to a low-pass filter. The cutoff frequency of the low-pass filter is preferably selected as the bandwidth of the EGR/ITH controller, defined from the oxygen flow rate error to the oxygen flow rate. In one example, the cutoff frequency was selected as 0.5 RAD/S. However, various factors such as controller stability and feedback control performance effect the selection of this frequency. Therefore, various values may be used according to the present invention. In another example, the cutoff frequency is made a calibratable function of engine operating conditions. Also, it may be desirable to increase this cutoff frequency as high as possible, thereby improving controller performance and minimizing control action necessary from the HC injector. The highest possible cutoff frequency is equal to the bandwidth of the EGR/ITH controller. Then, the oxygen flow rate error minus the low-pass filtered error is fed to the feed-forward controller to determine the HC injection quantity. Further, the low-pass filtered oxygen flow rate error is fed to the EGR/ITH PI controller, which determines the control action for the EGR valve and the throttle valve.

Figure 5:
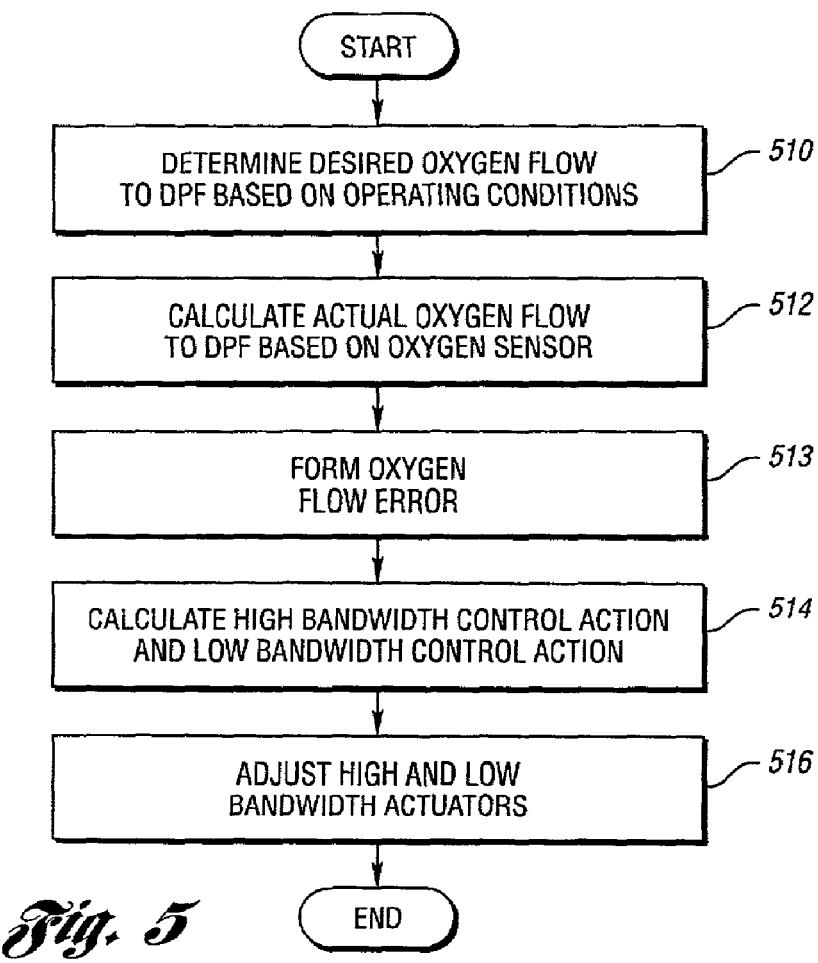
FIG. 5 shows a routine for adjusting control actuators in a high level flow diagram.

More specifically, referring now to FIG. 5, a routine is described for controlling oxygen entering the DPF. First, in step 510, the routine determines a desired oxygen flow rate to the DPF based on operating conditions. In the particular embodiment, this desired oxygen flow rate is based on particulate filter temperature, which is predetermined temperature above which degradation may occur at the engine operating point. Note that the desired oxygen flow rate determination is based on potentially conflicting goals. For example, high oxygen flow rate generally results in a large gas flow through the particulate filter, which can carry away heat. However, high oxygen amounts entering the particulate filter can result in the self-sustaining regeneration reaching temperatures greater than an allowable temperature. Thus, based on operating conditions such as engine speed and engine load, an optimal oxygen flow rate can be determined. However, in an alternate embodiment, a single, compromised desired oxygen flow rate can be used.

Next, in step 512, the actual oxygen flow rate entering the DPF is determined based on, for example, the oxygen sensor. Alternatively, one can base this determination on other engine operating conditions, such as fuel injection amount, the engine speed, and manifold pressure, or a mass air flow sensor and fuel injection amount. Then, in step 513, the oxygen flow error is formed as described above herein.

Next, in step 514, the high bandwidth control action and the low bandwidth control action are calculated using the control structure described above. Finally, in step 516, the routine adjusts the high and low bandwidth actuators based on the control action calculated in step 514.

Figure 6:
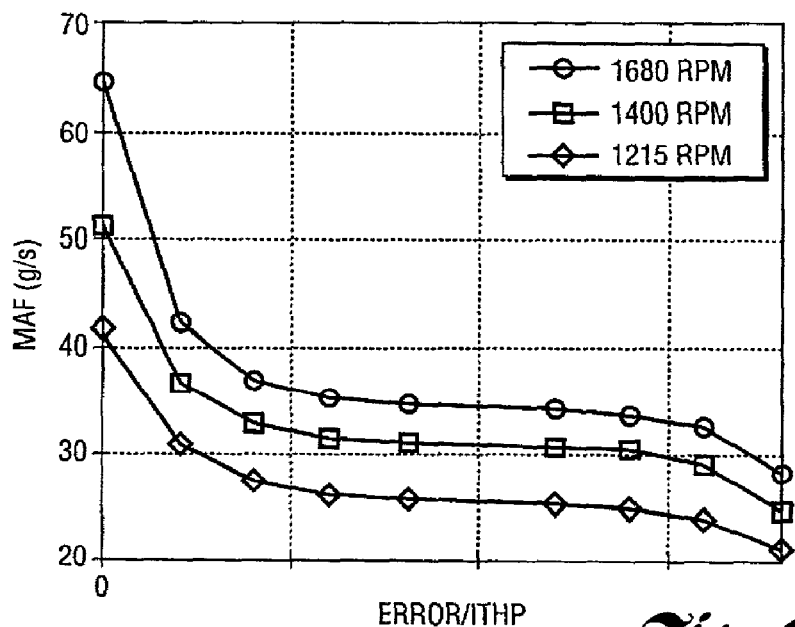
FIG. 6 shows exemplary system data describing how exhaust gas recirculation valve position and throttle position influence oxygen flow rate in the exhaust system.

Referring now to FIG. 6, a plot is shown illustrating the effects of the EGR valve position and the intake throttle position on mass air flow at differing engine speeds. In one embodiment of the present invention described above, the EGR and the ITH are treated as a single actuator in the Pi controller. In this embodiment, beginning with unrestricted air flow (EGR completely closed and ITH fully open) the PI controller operates sequentially by first opening EGR and then closing ITH. The output of the PI controller ranges in values from 0 to 2, where values in the range of 0 to 1 correspond to opening EGR while ITH is fully opened, and values in the range of 1 to 2 correspond to closing ITH while EGR is fully open. EGR position and intake throttle position influence oxygen flow rate in the exhaust system by limiting the mass air flow entering the engine as illustrated in FIG. 6.

The mass air flow is most sensitive to changes in the EGR position and the intake throttle position when EGR is slightly open and when ITH is slightly open. This non-linear relationship is accounted for in the control strategy by adjusting the proportional and integral gains by a sensitivity function. The sensitivity function is dependent on the EGR valve position and the intake throttle position and is of the form:

$$\frac{\Delta EGRP/ITHP}{\Delta MAF} = f(EGRP, ITHP)$$

Further, in an alternate embodiment, the sensitivity function is also dependent on engine speed and differential pressure across the DPF. In practice, normalizing the output of the sensitivity function by engine speed is a reasonable approximation to account forward the dependence of the sensitivity function on engine speed. Also note that the size of the proportional and integral gains are limited by the phase delay of the engine filling dynamics.

It should also be noted that a non-negligible delay exists between a change in EGR position/intake throttle position and the corresponding change in oxygen and flow in the exhaust feed gas. This delay is due in part to the time necessary for the intake air flow and the recirculated exhaust gas flow to equilibrate on the exhaust side of the engine. This phase delay limits the size of the controller gains of the PI controller. In practice, optimized controller values for the particular vehicle system be found via experimental testing.

In the present invention, the flow of gasses containing excess oxygen entering the DPF are limited to minimize the chance that the self-sustaining regeneration of the DPF cause excessively high temperatures which may degrade engine or exhaust system componentry. As described herein, there are various alternative embodiments for implementing the above solution. For example, various valves in the engine system can be used to control the exhaust gas flow rate and excess oxygen proportion entering the DPF. In particular, the valve, according to the present invention, can be an intake throttle, an exhaust gas recirculation control valve, a variable geometry turbocharger valve, a variable CAM timing valve, or a port deactivation valve. Further, any combination of the above can be used in coordination. Further, additional parameters can be used. For example, as described herein, a combination of an EGR valve, an intake throttle valve, and a hydrocarbon injector in the exhaust system are utilized in combination to control both exhaust flow rate, and excess oxygen concentration. However, as stated above, for example, solely the intake throttle could be used.

Also, the present invention is described with particular reference to a self-sustaining DPF regeneration. Such self-sustaining regeneration is used to refer to the regeneration of stored particles in the DPF that continues without additional control action beyond normal other engine operation. For example, the engine control system may need to adjust fuel injection timing, or other operating parameters, to initiate increased exhaust temperatures. Thus, these conditions would include non-normal operation required to start particulate filter regeneration. However, once the self-sustaining regeneration is reached, the engine operating parameters can be returned to whatever normal conditions require. As such, the particulate filter regeneration will continue as long as enough excess oxygen is present and there are stored particles left to be burned.

As another example, an external burner could be used to raise particulate filter temperature above the self-sustained regeneration temperature. After this point, the burner is no longer necessary and the self-sustaining reaction can proceed without any special control action by the engine controller. According to the present invention, this self-sustaining regeneration is monitored via, for example, the particulate filter temperature, and, in one example, when the temperature is greater than a predetermined temperature control, action is taken to limit excess oxygen and thereby limit the diesel particulate filter regeneration reaction rate. This limits the self-sustaining reaction, thereby limiting temperature and minimizing any potential degradation.

This concludes the detailed description of the invention. Note that there are various alternate embodiments according to the present invention. For example, as described above, there are various parameters that can be used to limit oxygen entering a DPF during a self-sustained filter regeneration interval. Also note that it is not necessary and not intended to completely stop filter regeneration to prevent DPF temperature from becoming greater than an allowable temperature. In particular, during some operating conditions, excess oxygen fed to the DPF can be reduced thereby slowing the exothermic reactions in the DPF, but still providing enough gas flow rate through the DPF to carry away enough excess heat from this continued regeneration so that DPF temperature is maintained at or below an allowable temperature.

The invention claimed is:

1. A method for operating an engine coupled to an exhaust system having a diesel particulate filter, where the exhaust system terminates at a tailpipe, the engine having an electronically controlled variable geometry turbocharger valve that adjusts oxygen flow entering the engine, the method comprising:
   commencing a self-sustaining filter regeneration;
   detecting temperature indicative of said diesel particulate filter;
   controlling air flow via the variable geometry turbocharger valve based an said detected temperature so as to prevent temperature of the diesel particulate filter from rising to a point that causes degradation due to excessive exothermic reaction by adjusting the turbocharger valve to decrease said air flow, while continuing filter regeneration; and
   continuously flowing all exhaust emitted from the tailpipe through the particulate filter.

2. A system comprising:
   a diesel engine having an exhaust system that terminates at a tailpipe;
   an electronically controlled valve coupled to said engine;
   an exhaust gas recirculation valve coupled to said engine;
   a hydrocarbon injector coupled in an exhaust system of the engine;
   an exhaust gas oxygen sensor coupled in said exhaust system of the engine;
   a diesel particulate filter in said exhaust system coupled to said engine, said filter coupled downstream of said exhaust gas oxygen sensor; and
   a controller for commencing self-sustaining regeneration of said particulate filter, determining temperature of the filter, if said temperature is greater than a limit, determining a desired oxygen amount entering said filter and coordinating adjustment of said valve, said exhaust gas recirculation valve, and said injector to reduce oxygen entering said filter to said desired oxygen amount using feedback from said oxygen sensor and to limit said self-sustaining regeneration reaction, while controlling a flow rate of exhaust gas, where all exhaust emitted from the tailpipe is continuously flowed through the particulate filter.

3. The system recited in claim 2 wherein said electronically controlled valve is an electronically controlled throttle valve.

4. The system recited in claim 3 wherein said controller commences said self-sustaining regeneration by adjusting engine operating parameters away from normal operating conditions to raise said temperature of the filter to a temperature necessary to initiate reaction, and then returning said engine operating parameters to said normal conditions.

5. The system recited in claim 4 wherein said diesel particulate filter comprises SiC.

6. The system recited in claim 5 wherein said diesel particulate filter comprises cordierite.

7. The system recited in claim 6 wherein said controller limits said self-sustaining regeneration reaction by preventing temperature of said particulate filter from becoming greater than a predetermined value.

8. A system comprising:
   a diesel engine having an exhaust system that terminates at a tailpipe;
   an electronically controlled valve coupled to said engine;
   an exhaust gas recirculation valve coupled to said engine;
   a hydrocarbon injector coupled in an exhaust system of the engine;
   a diesel particulate filter in said exhaust system coupled to said engine; and
   a controller for commencing self-sustaining regeneration of said particulate filter, determining temperature of the filter, if said temperature is greater than a limit, determining a desired oxygen amount entering said filter and coordinating adjustment of said valve, said exhaust gas recirculation valve, and said injector to reduce oxygen entering said filter to said desired oxygen amount using feedback from an oxygen sensor and to limit said self-sustaining regeneration reaction, while controlling a flow rate of exhaust gas, where all exhaust emitted from the tailpipe is continuously flowed through the particulate filter.

* * * * *